March 4, 1941. G. A. PHILIPPE 2,233,847

GLASS CUTTING MACHINE

Original Filed Dec. 16, 1938

George A. Philippe
INVENTOR

BY Philip A. Terrell
ATTORNEY

Patented Mar. 4, 1941

2,233,847

UNITED STATES PATENT OFFICE 2,233,847

GLASS CUTTING MACHINE

George A. Philippe, Henryetta, Okla., assignor of one-twentieth to Archie A. Kinion, Sand Springs, one-twentieth to Beulah M. Slaymaker, Tulsa, one-twentieth to H. B. Dowell, Sand Springs, and one-twentieth to Otho L. Slaymaker, Tulsa, Okla.

Original application December 16, 1938, Serial No. 246,227. Divided and this application March 24, 1939, Serial No. 263,967

3 Claims. (Cl. 33—32)

The invention relates to glass cutting machines and has for its object to provide means whereby the cutter, as it approaches the edge of a sheet of glass, is supported above the cutting table, and when the cutter reaches the edge of the sheet of glass the cutter is raised and deposited on the upper surface of the glass at the edge thereof, thereby obviating shattering of the edge of the glass.

A further object is to provide pivoted members in the form of inverted U-shaped members having downwardly diverging arms for supporting the cutter above the table as the machine moves over the sheet of glass and as the cutter approaches the edge of the sheet of glass one of the arms of the U-shaped members engages the glass edge and deposits the cutter on the upper face of the glass at the edge thereof.

A further object is to provide a glass cutting machine with cutter elevating and positioning means, pivotally mounted and so shaped and constructed that the elevating means, when engaging the edge of a sheet of glass, will elevate and deposit the cutter on the sheet of glass at the edge thereof, and when the cutter passes beyond the opposite side of the glass, said elevating means will prevent the cutter from engaging the table.

A further object is to provide cutter elevating means at opposite sides of the cutter so strips can be cut from either edge of the sheet of glass.

A further object is to provide a supporting wheel rearwardly of the cutter and adapted to engage the sheet of glass at the end of the cut when the cutter passes from the sheet, thereby preventing a ragged end to the cut.

A further object is to mount the V-shaped elevating devices adjacent the cutter and at opposite sides thereof.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
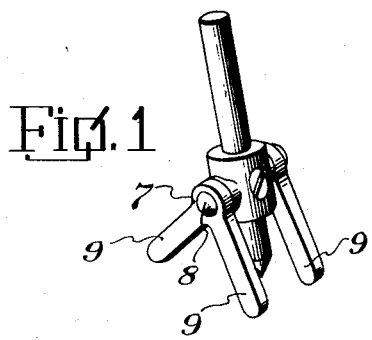
Figure 1 is a perspective view of the cutter, showing the elevating means in connection therewith.
Figure 2:
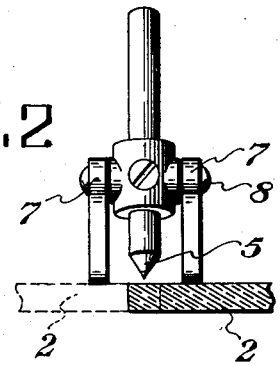
Figure 2 is a front elevation of the cutter positioned at the edge of a sheet of glass for cutting a strip from one side thereof.

The present application is a divisional part of my application on a glass cutting machine, filed December 16, 1938, Serial Number 246,227 which eventuated in Patent No. 2,184,126.

Referring to the drawing, the numeral 1 designates a traveling glass cutting machine carriage, which may be of any construction, and which moves over the sheet of glass 2, resting on the cutter table 3. The carriage 1 is provided with a pivoted arm 4, which arm, at its outer end, is provided with a glass cutter point 5, of conventional construction, and preferably of the diamond type. Although a particular structure of carriage is shown of the type set forth in my application above referred to, it is to be understood that the elevating means hereinafter set forth may be applied to any type of glass cutting machine.

Figure 3:
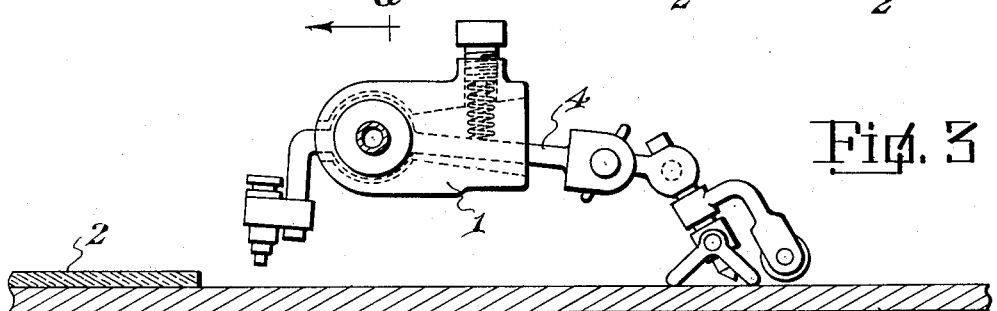
Figure 3 is a vertical longitudinal sectional view through a portion of a cutting table showing the cutting machine in approaching position to the sheet of material for the starting of the cutting operation.
Figure 4:
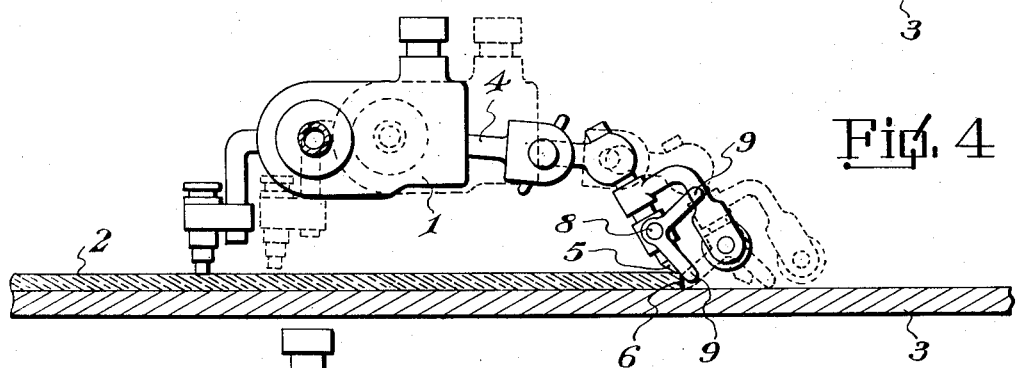
Figure 4 is a view similar to Figure 3 showing the elevating members in operative position, and the cutter deposited on the sheet of glass.

One of the main difficulties experienced in glass cutting machines has been that when the cutter engages the edge 6 of the sheet of glass it is shattered and often the diamond point is dislodged from the cutter. Another difficulty has been that when the cutter reaches the end of the cutting operation it drops on the table and is damaged. To obviate this difficulty inverted V-shaped members 7 are provided at opposite sides of the cutter and are pivotally mounted at 8 so they will swing downwardly by gravity. The diverging arms 9 of the V-shaped members engage the upper side of the table when the cutter is beyond the sides of the glass and prevent the cutter from coming into engagement with the table. As the carriage 1 is moved in the direction of the arrow a, Figure 3, the diverging arms 9 support the cutter as the arms slide over the table. When the cutter approaches the edge 6 of the sheet of glass 2, one of the arms 9 engages the edge of the sheet of glass and the U-shaped members 7 are pivotally moved from the dotted line position shown in Figure 4, to the full line position shown in Figure 4, and at the same time the cutter 5 is elevated and is deposited on the upper surface of the sheet of glass 2 at the edge thereof, thereby preventing shattering of the edge at the start of the cut. The V-shaped member 7 remains substantially in the full line position shown in Figure 4 during the cutting operation.

Figure 5:
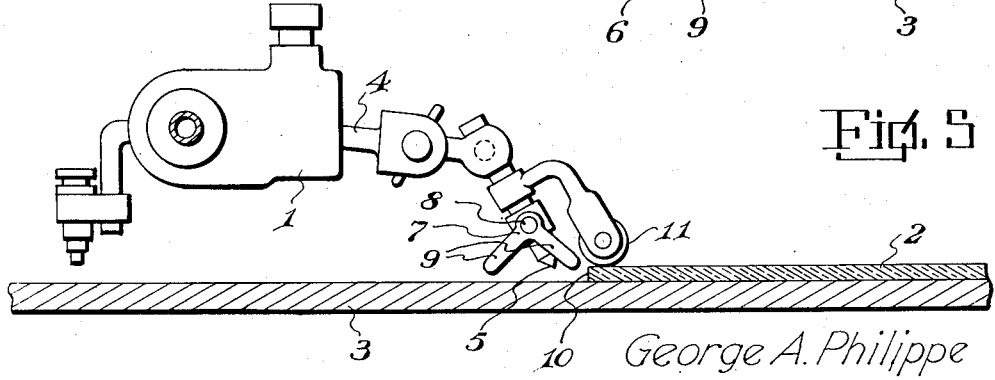
Figure 5 is a view similar to Figure 3 but showing the machine at the end of the cut.

As the cutter 5 passes from the edge 10 of the sheet of glass, at the end of the cut, the supporting wheel 11 engages the glass and prevents a downward shattering of the edge 10 at the finish of the cut. Just as soon as the actuated arm 9 of the member 7 clears the edge 10, the member 7 assumes its inverted position as shown in Figure 5, so that when the wheel 11 passes from the edge 10 of the sheet of glass the arms 9 will engage the upper face of the table 3 and prevent the cutter element 5 from engaging the table and being damaged thereby.

By providing two pivoted members 7, one at each side of the cutter 5, it will be seen that when a narrow strip is being cut from either the right or left hand side of a sheet of glass, during a straightening up operation, one of said members 7 will be in operative position.

From the above it will be seen that a glass cutting and elevating device is provided which will insure a clean cut during the cutting operation and the edges of the glass will not be shattered or the diamond injured by sudden engagement with the edges of the glass, or by engagement with the cutting table.

The invention having been set forth what is claimed as new and useful is:

1. The combination with a cutting element for glass carried by a glass cutting machine, said cutting element being carried by a pivoted arm movable in a vertical plane and adapted to traverse a sheet of glass disposed on a table and the table extending beyond the edge of the sheet of glass, of means for elevating the cutter element as it approaches the edge of the sheet of glass and supporting the cutter element spaced from the table, said means comprising a pivoted member adjacent the cutter element and movable upwardly and downwardly therewith, said last named member being pivotally movable in a vertical plane and having diverging downwardly extending arms, the ends of said downwardly diverging arms terminating in a plane forwardly and rearwardly of the cutting element and below the lower end of the cutting element whereby a two point supporting bearing is formed on the table, one of said arms being adapted to engage the edge of the sheet of glass and elevate the cutting element onto the glass during a cutting operation.

2. The combination with a pivoted cutter element carrying arm of a glass cutting machine adapted to traverse a sheet of glass on a table extending beyond the edge of the sheet of glass, said cutter carrying arm being pivotally movable in a vertical plane, of means for supporting said cutter element spaced from the table as it approaches and after it leaves the sheet of glass and also elevating the cutter element onto the sheet of glass, said means comprising a pivoted V-shaped member movable in a vertical plane adjacent the cutting elevent, said V-shaped member having its arms downwardly diverging and terminating forwardly and rearwardly of the cutting element and below the horizontal plane of the cutting element whereby said arms will engage the table and slide thereover and supporting the cutting element spaced from the table and one of said arms being positioned to engage the edge of the glass in advance of the cutting element thereby pivoting the V-shaped member and lifting and depositing the cutting element on the sheet of glass.

3. A device as set forth in claim 2 including a member carried by the pivoted arm and engaging the sheet of glass as the cutter element passes therefrom, thereby allowing the V-shaped member to swing downwardly and engage the table and support the cutting element above the table when the supporting member passes from the edge of the glass.

GEORGE A. PHILIPPE.